Sept. 29, 1970     E. B. HEDGEPETH     3,531,139

SWAY CONTROL FOR TRAILERS

Filed March 3, 1969

INVENTOR.
EDWARD B. HEDGEPETH
BY

HIS ATTORNEY

United States Patent Office 3,531,139
Patented Sept. 29, 1970

3,531,139
SWAY CONTROL FOR TRAILERS
Edward B. Hedgepeth, Salt Lake City, Utah, assignor of one-third each to Clifton E. Hedgepeth, Royce Doyle Hedgepeth, and Jetta V. Vincent
Filed Mar. 3, 1969, Ser. No. 803,618
Int. Cl. B60d 1/06
U.S. Cl. 280—446                                  10 Claims

ABSTRACT OF THE DISCLOSURE

The present invention consists of an improved side-sway control for trailer vehicles. The invention comprises an expandable and retractable, cylindrical friction brake mechanism the degree of braking resistance of which may be controlled at a point remote from the area at which friction is applied within the mechanism. The braking mechanism itself takes the form of a cylindrical brake having a friction-producing piston sleeve the externally applied, variable compression of which will effect a proper braking characteristic of the mechanism.

---

The present invention relates to side-sway controls for trailers and, more particularly to a new and improved cylindrical friction brake which is reliable, adjustable to give different braking characteristics, and operative for both expansion and retractions of the overall braking mechanism.

Accordingly, a principal object of the present invention is to provide a new and improved cylindrical friction brake.

A further object of the invention is to provide a cylindrical friction brake wherein the friction to be relied upon in the operation of the friction-brake mechanism is produced at a point interior of the brake and remote from sources of dirt, grit and other foreign matter.

An additional object of the invention is to provide a new and improved friction brake employing a compressible friction sleeve that can be variably compressed from a point exterior of the brake cylinder.

An additional object is to provide a cylindrical friction brake which is operative and has similar characteristics of operation for both elongations and also retractions of the composite cylindrical friction brake structure.

An additional object is to provide a cylindrical friction brake which can be articulatively connected to a trailer and hitch structure, this in such a manner as to accommodate various movements of the trailer relative to the towing vehicle, road undulations, and at the same time be easily adjustable to supply appropriate braking effects for various trailer loads.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 2:
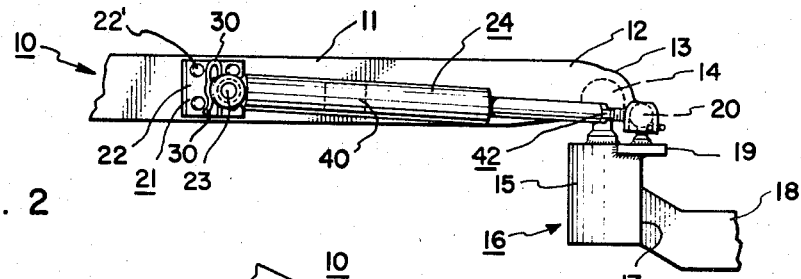
FIG. 2 is a fragmentary side elevation of the structure shown in FIG. 1.
Figure 1:
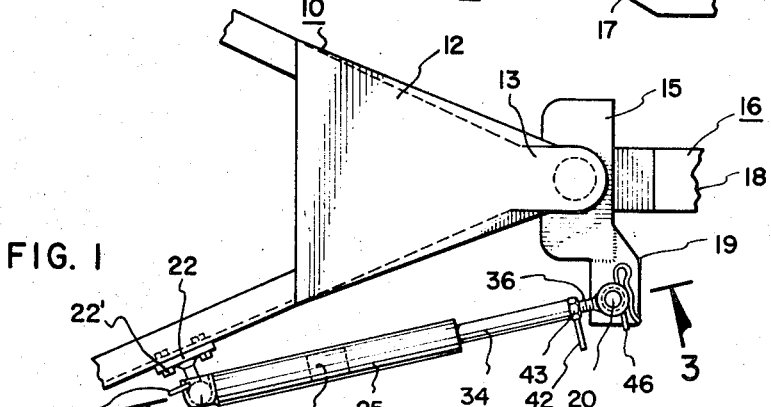
FIG. 1 is a fragmentary plan view of a trailer and trailer-hitch combination utilizing the cylindrical friction brake mechanism of the present invention.

In FIGS. 1 and 2 trailer 10 includes a conventional trailer frame 11 having tongue 12. The tongue 12 will include the usual apex socket 13 which rotatably engages mounting ball 14 of mounting head 15 in a conventional manner. Suitable locking means of conventional design will releasably secure the tongue 12 at socket receptacle 13 to a mounting ball 14. The manner of securement of the trailer apex socket to the mounting ball of a hitch head is strictly conventional, well known in the art, and forms no part of the present invention.

Mounting head 15 is a component member of hitch 16. Secured to the forward wall 17 of the mounting head 15 is a drawbar 18. The latter is affixed to the axle or frame of a towing vehicle.

Secured to mounting head 15 is an extension plate 19. Plate 19 may be welded in place if desired. The same includes an upstanding ball mount 20; correspondingly, trailer frame 11 includes a mount 21 having a mounting plate 22 secured by bolt attachments 22' to frame 11 and mounting ball 23 formed integrally with or otherwise affixed to the mounting plate 22.

That which forms the present invention is the cylindrical friction brake 24 as seen in FIGS. 1 and 2. It will be noted that friction brake 24 is disposed between and secured to the ball mounts 20 and 23 as seen in FIG. 2. While such a friction brake can be used on opposite sides of the trailer-hitch combination to form a working pair of brakes, yet the employment of but a single brake, as shown, has proven satisfactory.

Figure 3:
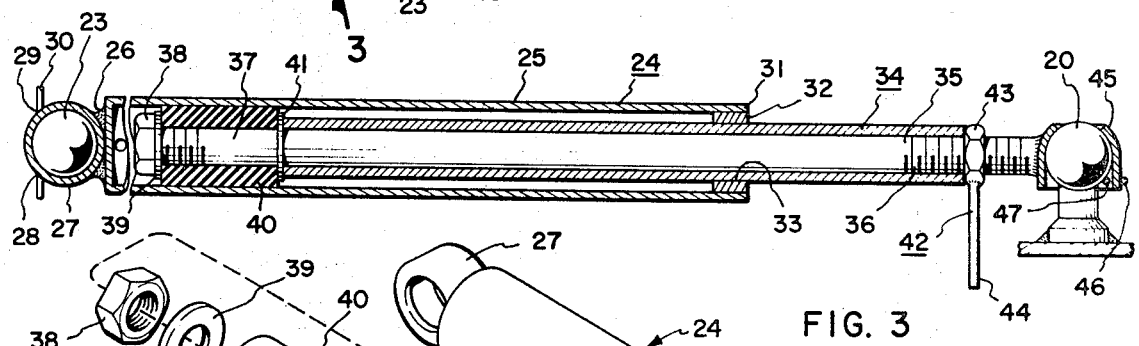
FIG. 3 is an enlarged, fragmentary, vertical section taken along the elongate axis of the cylindrical friction brake mechanism of the present invention with the piston or piston sleeve being in its medial position within the brake cylinder.
Figure 4:
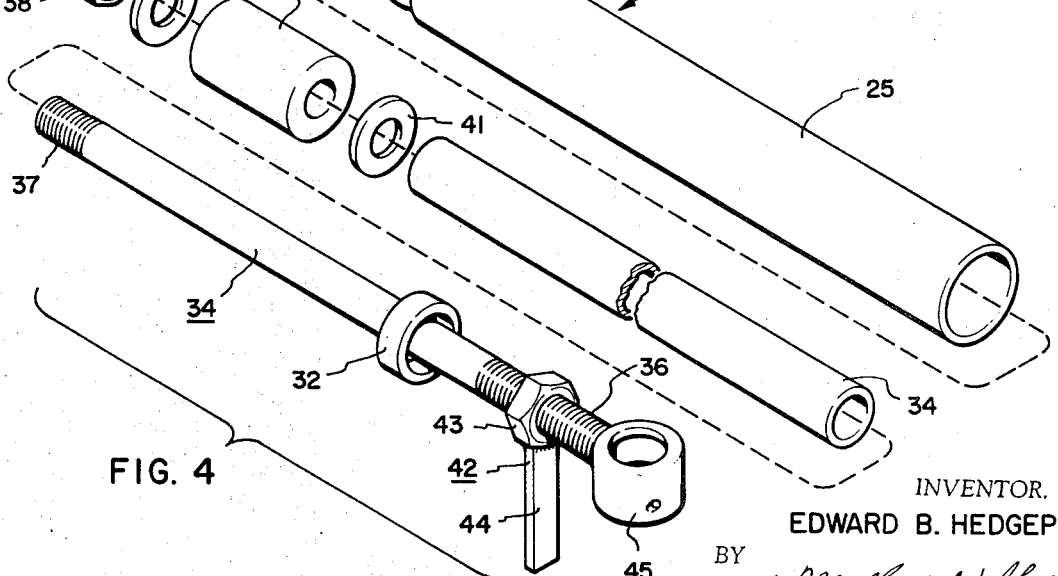
FIG. 4 is an exploded perspective view of the cylindrical friction brake structure of the present invention.

The structural details of the cylindrical friction brake of the present invention are illustrated in FIGS. 3 and 4. Cylindrical friction brake 24 is therein shown to include a cylinder 25 to the rearward extremity 26 of which is welded or otherwise secured socket 27. Socket 27 includes aligned apertures 28 and 29 for receiving askew locking pin 30. The purpose for pin 30 is to secure the socket 27 to mounting ball 23 as seen in FIG. 2. The forward extremity 31 of cylinder 25 is provided with a bushing 32 pressed or otherwise secured within this extremity, which bushing 32 is provided with a journaling aperture 33 for slideably receiving brake adjustment sleeve 34. The former longitudinally circumscribes adjustment sleeve 34 and piston rod 35 the latter of which is threaded at respective end portions 36 and 37. End portion 37 threadedly receives nut 38 which backs washer 39. A resilient, axially compressible, radially expandable piston sleeve 40 is preferably made of rubber or such substances as those going under the names neoprene or Adaprene. The last-named material is especially useful as the same exhibits long-life characteristics, optimum friction qualities, resilience, reliability, and so forth. Bearing washer 41 is disposed at the forward surface of piston sleeve 40. Brake adjustment sleeve 34 directly bears on the forward surface of washer 41 and may be welded thereto, if desired. Brake adjuster 42 includes a nut 43 and also a handle 44. Handle 44 is preferably welded or otherwise secured to the nut 43. A washer, of course, may be disposed between nut 43 and the forward end of sleeve 34 as desired.

It will be seen relative to FIG. 3 that the compression applied against piston sleeve 40 may be adjusted by the rotation of nut 43 by handle 44. Variation in this compression of piston sleeve 40 will in turn vary in magnitude the force normal of the piston sleeve radially outwardly against the inner wall of cylinder 25. Accordingly, when one desires an increased braking effect, and such effect will be operative for both extensions and retractions of the braking mechanism, then the user need only rotationally displace the brake adjustment 42 so as to increase the compression loading upon piston sleeve 40; correspondingly, by withdrawing brake adjustment 42 relative to its position on piston rod 35, as by rotationally displacing the same upon the piston rod in a counterdirection, the operator will effect a lessening of the compressive force exerted upon piston sleeve 40 and hence a lessening of friction as between piston sleeve 40 and the inner wall of cylinder 25

Socket 45 may be chosen to be similar to socket 27 in FIG. 2 and is constructed to receive mounting ball 20 at the forward end of friction brake 25. A locking pin 46 is provided and can be inserted in appropriate aligned apertures 47 provided in the socket in a manner similar to that shown in connection with socket 27.

It is noted that the mounting balls associated with the trailer frame are oriented along horizontal and vertical directions, respectively. While this is the preferred structural arrangement, it is conceivable that other types of articulative or pivotal connections may be used. It is to be noted that, in any event, the articulative joints, fore and aft, of the cylindrical friction brake should be such that pivotal swings of the trailer relative to the hitch are accommodated, and this with variations in mutual disposition of the hitch and trailer frame owing to road undulations.

In operation the tongue of the trailer is secured over the mounting ball of the hitch and the two releasably secured together in a conventional manner. At this point the cylindrical friction brake of the present invention may be installed over the mounting balls 20 and 23 in a manner hereinbefore described.

Again, the cylindrical friction brake 24 of the present invention serves as a side-sway control. The greater the weight of the trailer and its load, the greater will one wish to actuate handle 44 of brake adjuster 42 so as to compress appropriately piston sleeve 40 and thereby increase the friction thereon upon the inner wall of cylinder 25. It is noted that the braking effect of the present invention effecting the side-sway control is produced for both elongations and retractions of a composite cylindrical friction brake construction. The lighter the trailer and load, the less piston sleeve will have to be compressed by the forwardly advancement of nut 43 and the compression complied thereby to brake adjustment sleeve 34.

For heavy loads, and where special care is needed to avoid appreciable degrees of side-sway, then the brake adjuster 42 will have to be turned down appreciably so as to increase the compression loading of piston or elastomeric sleeve 40 and its frictional engagement with the inner wall of cylinder 25.

What is provided, hence, is an extremely effective side-sway control for trailers wherein braking is provided in both directions, that is during conditions of both elongation and also retraction of the composite cylindrical friction brake construction. Special note is to be made that the magnitude of the braking function is controlled at a point exterior of that area in which frictional forces are applied, thereby providing accessibility of brake control as well as insuring that the friction producing parts are isolated from possible sources of foreign matter. By use of the brake adjuster 42 and its coaction with brake adjustment sleeve 34, any desired degree of friction braking may be provided for a given trailer load. Accordingly, and with the proper setting of the friction brake for the trailer load, tendencies of the trailer to "fish-tail," i.e. be subjected to extreme degrees of side-sway during turning moments of the towing vehicle, are substantially eliminated.

It is obvious relative to FIGS. 1 and 2 that the orientation of the friction brake may be reversed end for end without departing from the principles of this present invention. Also, a pair of friction brakes, one of which is shown, may be employed on opposite sides of the pivotal connection of the trailer frame and hitch, and be connected in like manner thereto by ball and socket joints as illustrated in FIGS. 1 and 2, for controlling trailer side-sway.

While particular embodiments of the present invention have been shown and described, it will be obvious to those skilled in the art that changes and modifications may be made without departing from this invention in its broader aspects, and within the true spirit and scope of the invention.

I claim:

1. In a pivotally-intercoupled trailer and trailer-hitch combination, an improvement comprising a side-sway controlling friction brake operatively connected to and between said trailer and said trailer hitch, said friction brake comprising a brake cylinder, a piston rod disposed within said brake cylinder and movably extending outwardly therefrom, an axially compressible, radially expandable, friction-producing piston mounted to said piston rod, and means for selectively compressing said piston to expand the latter to frictionally, interiorly engage said brake cylinder in a desired manner.

2. Structure according to claim 1 wherein said piston comprises an elastomeric sleeve mounted upon said piston rod.

3. Structure according to claim 1 wherein said piston comprises an elastomeric sleeve mounted upon said piston rod, said structure including a pair of washers backing opposite ends of said sleeve, a nut threadedly engaging said piston rod at that extremity thereof contained within said brake cylinder, a tubular adjustment sleeve axially disposed about said piston rod and engaging a respected one of said washers, and adjustment means threaded upon such piston rod and operatively engaging said adjustment sleeve.

4. Structure according to claim 1 wherein each of said brake cylinder and said piston rod include ball and socket mounting means operatively affixed said trailer and trailer hitch.

5. Structure according to claim 1 wherein said friction brake includes means disposed within and extending outwardly of said brake cylinder for varying the compression loading of said piston in accordance with the braking resistance desired of said friction brake.

6. Structure according to claim 1 wherein said brake cylinder includes a bushing, sleeve means longitudinally journaled within said bushing and receiving said piston rod, said sleeve means being constructed and arranged to compress said piston, and means for urging said sleeve means toward said piston.

7. Structure according to claim 1 wherein said friction brake includes articulative, ball and socket means for securement of said friction brake to said trailer and trailer hitch, respectively, said ball and socket means including pin means for releasably securing said respective ball and socket joints together.

8. Structure according to claim 1 wherein said friction brake includes an adjustment sleeve journaled for longitudinal movement within said brake cylinder and operatively associated with said piston for compressing the latter, and means operatively engaging said adjustment sleeve for thrusting the latter in an operative direction towards said piston to compress the same.

9. Structure according to claim 1 wherein said friction brake includes means operatively associated with said piston rod for selectively varying the compression of said piston and, hence, its frictional interaction with said brake cylinder.

10. Stucture according to claim 1 wherein said piston is positioned medially within said cylinder when said trailer hitch and trailer are rectilinearly oriented forwardly.

References Cited

UNITED STATES PATENTS 3,294,421  12/1966  Mathisen _____ 280—446

FOREIGN PATENTS 1,490,600  6/1967  France.

LEO FRIAGLIA, Primary Examiner